(12) United States Patent
Blasczyk

(10) Patent No.: US 9,322,502 B2
(45) Date of Patent: Apr. 26, 2016

(54) DEVICE AND SYSTEM FOR PULLING A COMPRESSED PIPE LINER INTO A HOST PIPE

(71) Applicant: SAK Construction, LLC, O'Fallon, MO (US)

(72) Inventor: James H. Blasczyk, Friendswood, TX (US)

(73) Assignee: Sak Construction, LLC, St. Louis, MO (US)

( * ) Notice: Subject to any disclaimer, the term of this patent is extended or adjusted under 35 U.S.C. 154(b) by 64 days.

(21) Appl. No.: 14/211,495

(22) Filed: Mar. 14, 2014

(65) Prior Publication Data

US 2014/0270969 A1 Sep. 18, 2014

Related U.S. Application Data

(60) Provisional application No. 61/785,297, filed on Mar. 14, 2013.

(51) Int. Cl.
*F16L 1/06* (2006.01)
*F16L 55/165* (2006.01)
*F16L 21/08* (2006.01)
*B29C 63/34* (2006.01)

(52) U.S. Cl.
CPC ............ *F16L 55/1652* (2013.01); *B29C 63/346* (2013.01); *F16L 21/08* (2013.01)

(58) Field of Classification Search
CPC ........ B29C 55/30; B29C 49/26; B29C 63/34; B29C 63/346; F16L 55/16; F16L 55/1652; F16L 1/11; F16L 1/06; F16L 55/168; Y10T 29/53652; E21B 43/103
See application file for complete search history.

(56) References Cited

U.S. PATENT DOCUMENTS

| | | | | | |
|---|---|---|---|---|---|
| 3,805,846 | A | * | 4/1974 | Hannover | 138/109 |
| 3,887,983 | A | | 6/1975 | Province | |
| 3,959,424 | A | | 5/1976 | Dawson et al. | |
| 4,028,037 | A | | 6/1977 | Dawson | |
| 4,718,701 | A | | 1/1988 | Vigneron et al. | |
| 4,720,211 | A | | 1/1988 | Streatfield et al. | |
| 4,776,370 | A | * | 10/1988 | Long, Jr. | 138/98 |
| 4,777,984 | A | | 10/1988 | Storah | |
| 5,048,174 | A | | 9/1991 | McGuire | |
| 5,167,056 | A | | 12/1992 | McGuire | |
| 5,306,449 | A | * | 4/1994 | Brittain et al. | 264/36.17 |

(Continued)

FOREIGN PATENT DOCUMENTS

| | | | |
|---|---|---|---|
| JP | 60141329 | A | 7/1985 |
| JP | 63115611 | A | 5/1988 |

(Continued)

OTHER PUBLICATIONS

International Search Report, International Patent Application No. PCT/US2014/028015, issued on Jul. 18, 2014, 14 pages.

(Continued)

*Primary Examiner* — Benjamin Fiorello
*Assistant Examiner* — Carib Oquendo
(74) *Attorney, Agent, or Firm* — Lewis Rice LLC

(57) ABSTRACT

Systems and methods for pulling a pipe liner through a host pipe comprising a pulling head with a number of fingers having flexion points which move from an open orientation to a closed position when the pulling head is placed under tension from winch to thread a pipe liner through a host pipe.

9 Claims, 4 Drawing Sheets

(56) References Cited

U.S. PATENT DOCUMENTS

| | | |
|---|---|---|
| 5,522,678 A | 6/1996 | Marshall et al. |
| 5,580,589 A | 12/1996 | Stoves et al. |
| 5,992,467 A | 11/1999 | Roach |
| RE36,859 E | 9/2000 | Storah |
| 6,539,978 B1 | 4/2003 | McGuire |
| 6,979,025 B2 | 12/2005 | Conder et al. |
| 7,861,743 B1 | 1/2011 | Wren |
| 2007/0012373 A1 | 1/2007 | Driver |

FOREIGN PATENT DOCUMENTS

| | | |
|---|---|---|
| JP | 0814477 A | 1/1996 |
| JP | 200210712 A | 8/2000 |
| WO | 90/02904 A1 | 3/1990 |
| WO | 01/16520 A1 | 3/2001 |

OTHER PUBLICATIONS

International Search Report, International Patent Application No. PCT/US2014/027685, issued on Jun. 26, 2014, 11 pages.

International Search Report, International Patent Application No. PCT/US2014/024221, issued on Jun. 27, 2014, 12 pages.

International Search Report, International Patent Application No. PCT/US2014/024490, issued on Jul. 24, 2014, 10 pages.

* cited by examiner

DEVICE AND SYSTEM FOR PULLING A COMPRESSED PIPE LINER INTO A HOST PIPE

CROSS REFERENCE TO RELATED APPLICATIONS

This application claims benefit of U.S. Provisional Patent Application No. 61/785,297, filed Mar. 14, 2013, the entire disclosure of which is incorporated herein by reference.

BRIEF DESCRIPTION OF THE DRAWINGS

1. Field of the Invention

This disclosure is related to the field of pipe lining systems, specifically to pipe lining systems which use a rigid die to compress a plastic pipe liner for insertion into another pipe via a pulling force exerted by a towing head.

2. Description of the Related Art

Over time, the underground pipelines utilized for the transport of fluids, gases or other elements can become damaged, worn or corroded from use. In the past, the methodologies utilized for rehabilitating these underground or underwater pipelines were costly, labor intensive, and severely disruptive to the surrounding environment and communities.

Today, one of the primary methods and systems utilized in the prior art for rehabilitating existing pipeline systems and networks and to avert these problems is to line existing pipelines with an extremely tight fitting polyethylene (PE) pipe (the "liner"). In the prior art lining process, the liner has an outside diameter that is slightly larger than the inside diameter of the existing pipe being lined. Because of the difference in diameter between the liner and the existing pipeline, the liner is pulled through a die as part of the prior art lining process.

Generally, the liner pipe is pulled through the die after sections of the liner are butt fused together to form a continuous string. The die temporarily reduces the diameter of the liner. This reduction allows the liner to be easily pulled through the outer existing pipe system. The die used in the prior art systems generally has an entry, a throat and an exit, with the entry decreasing in diameter towards the throat and increasing in diameter away from the throat. Thus, the liner has a maximum diameter before the die, a minimum diameter in the die, and an intermediate diameter after the die. It is not uncommon for a heating element to be applied to the liner prior to liner being reduced in the die, the heating element being used to facilitate the reduction of the liner.

The tension given to the liner by the die is generally maintained by a pulling element until the liner is correctly located within the existing pipeline. Commonly, the liner is pulled through the die and the existing pipe system by a winch or towing head. Generally, the force of pulling rendered by the winch or towing head is half the yield strength of the liner or less. It is not uncommon for the forces exerted on the die and winch or pulling head to be very large, often exceeding 100 tons.

Figure 1:
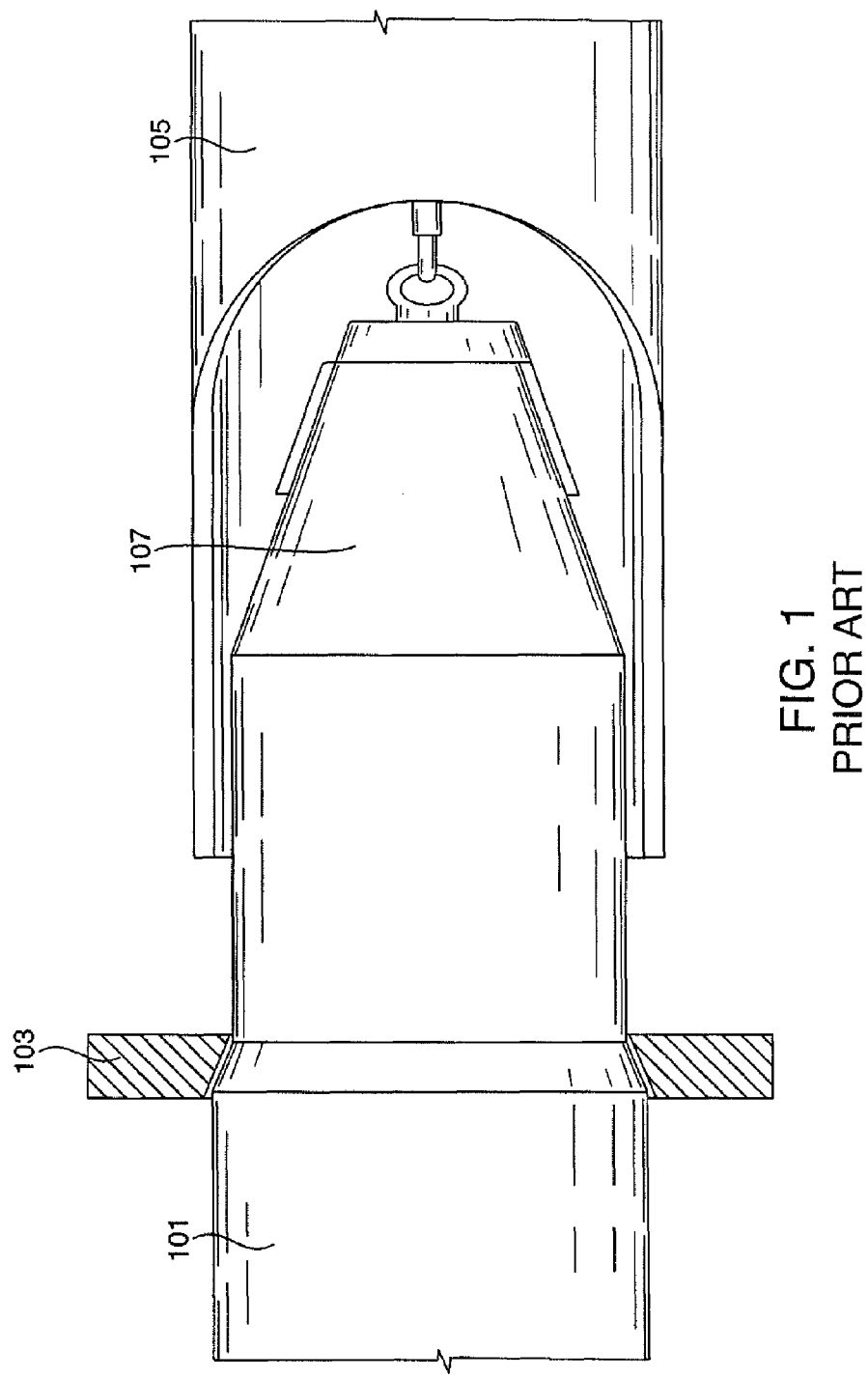

Since the liner retains a memory of its original shape and size, it will return to its original shape and diameter as soon as the pulling force is disconnected. When the pulling force is disconnected, the liner presses tightly against the inside of the existing pipeline to which it was applied, eliminating any annular space. FIG. 1 depicts the portion of the prior art pipe lining process in which a new liner (101) is pulled through a reducing die (103) (thereby reducing its diameter) and into the existing pipeline (105) (at its reduced diameter) by a towing head (107) or winch.

Although the prior art pipe lining process held numerous benefits for the industry at the time it was released, including, but not limited to, reducing disruption, creating a strong new pipe, jointless construction, improved flow, and cost savings, the prior art has numerous deficiencies in terms of cost, safety and efficiency.

For example, due to the large force vectors exerted, massive ground anchors have to be utilized in the prior art pipe lining system for both the die and the pulling head in order to withstand these forces. These anchoring systems can be cumbersome, costly, not readily transportable, and inefficient.

Another problem with the currently utilized methodology arises from the use of a single reducing die mechanism. Fully reducing the die in a single step often results in extreme point friction on the liner in addition to strain on the liner and joints. This strain and friction often results in mechanical failure of the liner both pre- and post-insertion.

Still another problem in the current methodology is post-release creep. After the tension in the system is released, it is not uncommon for the inserted liner to creep or shrink more than expected. Generally, this gradual creep continues for a significant period of time after the insertion and release of the liner. This continued moving and pulling of the inserted liner out of its fittings is problematic because it results in a mis-formed liner that is susceptible to potential leaks.

Further, the currently employed pipe lining system is generally performed at the level of the pipe. Stated differently, chambers at the level of the pipe (below ground or water) are excavated at each end of the existing pipeline that will be lined. The die of the system is placed within the excavated chamber at the front of the existing pipeline that will be lined. These chambers are costly and time intensive to build. In addition, the excavation involved in creating these chambers can be disruptive to both the environment and the community. Further, because the die is placed within the chamber in these systems, there is often not much space between the reducing die and the existing pipeline, as demonstrated in the prior art disclosed in FIG. 1.

This is problematic for a number of reasons. Mainly, when the tension in the system is released, the inserted liner, in returning to its original diameter, shortens in length. With the die located in such close proximity to the existing pipeline, the end of the liner often gets unintentionally sucked into the existing pipeline, resulting in an incomplete lining situation. Another problem associated with the excavated chambers utilized in the current methodologies is the small restricted work area created by the trench. Due, in part, to the large and dangerous force vectors associated with the system, these restricted work areas pose safety risks for laborers working therein. For example, disengagement of the reducing die can cause the release of screws at a high velocity. Still further, under this methodology the reducing die is removed from the system under loaded conditions, i.e., the die is released from the liner while the liner is still under extreme pressure from both the towing head and the placement in the existing pipeline system.

Other problems commonly experienced with the prior art lining methodologies are related to the currently utilized pulling heads. Due to the extreme force vectors present in the system, it is not uncommon for the currently utilized pulling heads yanking off or experiencing mechanical failure during insertion. This causes an incomplete lining of the existing pipeline. Further, the shortened inserted liner in this situation may not be at a joint and, therefore, may be difficult to access by laborers in their attempt to remedy the situation. In addition, as demonstrated in FIG. 1, the pulling heads currently utilized in the art, due to their wide shape and sometimes bulky orientation, often get stuck at bends in the existing pipeline and at areas in the existing pipeline where there is an offset.

SUMMARY

The following is a summary of the invention which should provide to the reader a basic understanding of some aspects of the invention. This summary is not intended to identify critical components of the invention, nor in any way to delineate the scope of the invention. The sole purpose of this summary is to present in simplified language some aspects of the invention as a prelude to the more detailed description presented below.

Because of these and other problems in the art, described herein, among other things, is a flexible pulling head device and system for pulling a compressed liner into a host pipe.

In an embodiment, the pulling head is a device for pulling a compressed pipe liner into a host pipe, the device comprising: a pulling head, the pulling head being comprised of a body and a plurality of fingers attached to the body at flexion points; wherein the plurality of fingers pivot at the flexion points from an open orientation to a closed orientation when the pulling head is placed under tension from a winch.

In another embodiment, the pulling head is attached to the terminating end of a liner pipe.

In another embodiment, the pulling head is butt fused to the terminating end of a liner pipe.

In another embodiment, the pulling head is comprised of five fingers.

In another embodiment, the pulling head is comprised of six fingers.

In another embodiment, two or more bore holes are located on each of the plurality of fingers, the two or more bore holes being oriented in a biased orientation.

In another embodiment, two or more bore holes are located on the body of the pulling head for each of the plurality of fingers, the bore holes being oriented in a biased orientation.

In another embodiment, the pulling head is connected to the winch via a plurality of cables.

In another embodiment, each of the plurality of fingers has a steel plate attached thereto across the associated flexion point.

In another embodiment, the number of steel plates directly corresponds to the number of fingers.

In another embodiment, the steel plates comprise a bend, an attachment hole and a plurality of bore holes, the bend corresponding to the flexion point of the associated finger.

In another embodiment, the steel plates are attached to the fingers of the pulling head via the bore holes and an attachment means.

BRIEF DESCRIPTION OF THE DRAWINGS

FIG. 1 depicts an example of the prior art pipe liner process.

Figure 2:
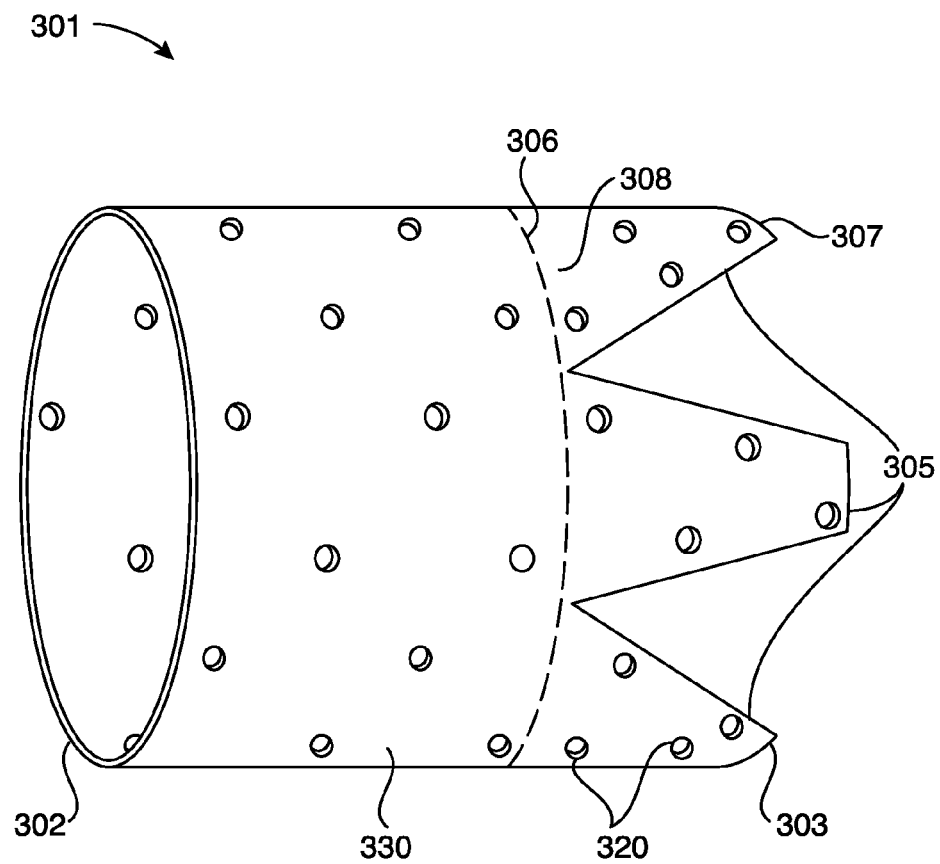

FIG. 2 depicts an embodiment of the pulling head in an open orientation.

Figure 3:
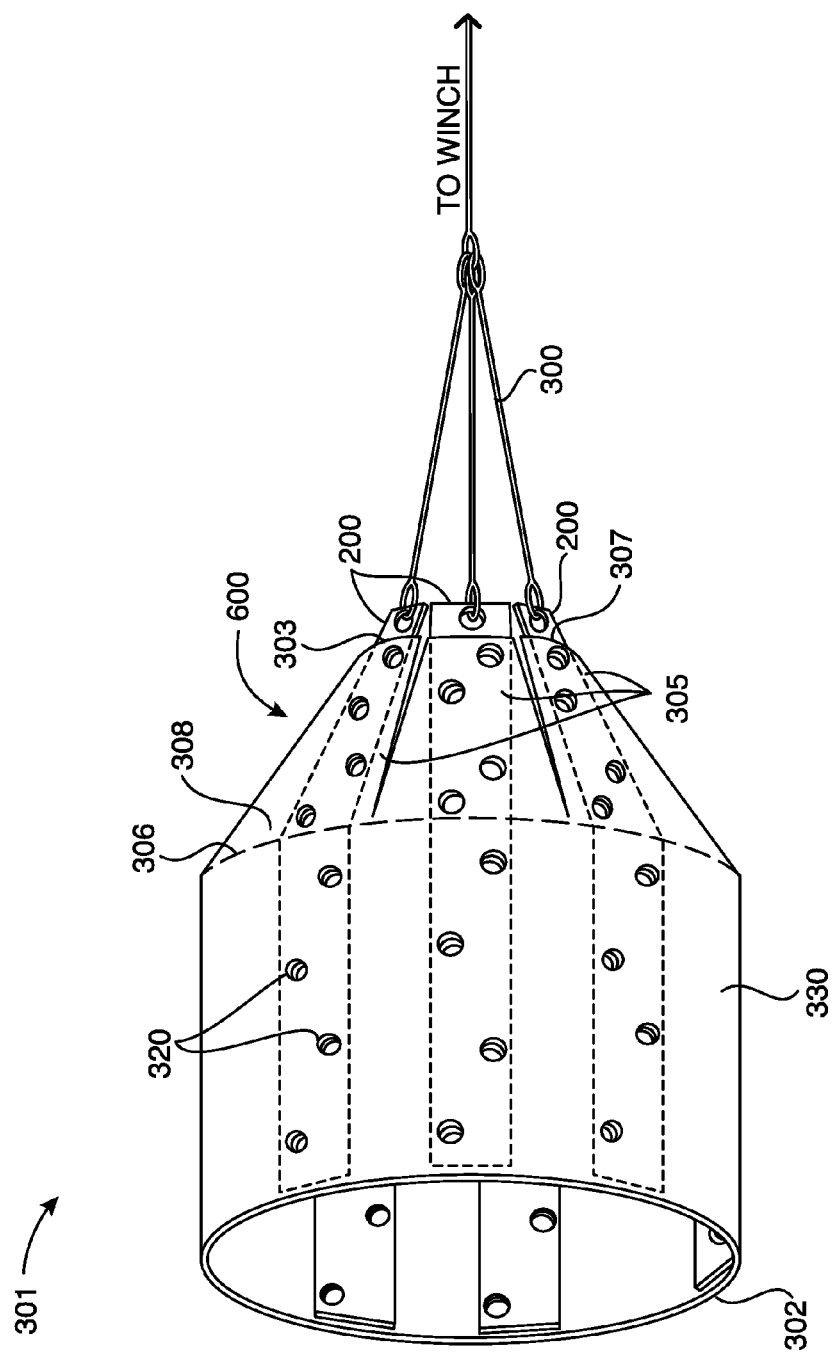

FIG. 3 depicts an embodiment of the pulling head in an engaged orientation.

Figure 4:
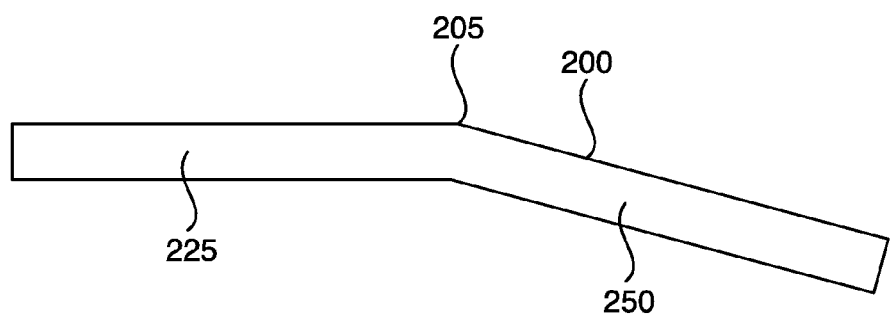

FIG. 4 depicts a side view of an embodiment of steel plates.

Figure 5:
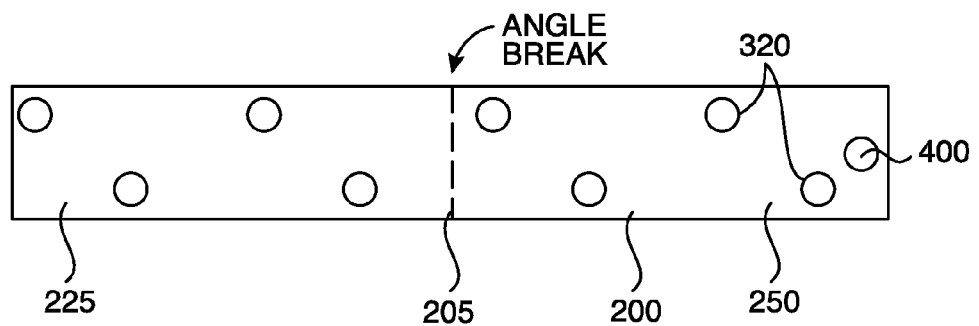

FIG. 5 depicts a top view of an embodiment of steel plates.

DESCRIPTION OF THE PREFERRED EMBODIMENT(S)

The following detailed description and disclosure illustrates by way of example and not by way of limitation. This description will clearly enable one skilled in the art to make and use the disclosed systems and apparatus, and describes several embodiments, adaptations, variations, alternatives and uses of the disclosed systems and apparatus. As various changes could be made in the above constructions without departing from the scope of the disclosures, it is intended that all matter contained in the above description or shown in the accompanying drawings shall be interpreted as illustrative and not in a limiting sense.

An embodiment of the flexible pulling head device and system disclosed herein is provided in FIG. 2. The pulling head (301) is comprised of a back end (302), a front end (303) and a length therebetween. The back end (302) of the pulling head (301) is sized and shaped to allow the back end (302) of the pulling head to be attached to a terminating end of a liner pipe utilized for lining existing pipelines, such as a polyethylene (PE) pipe. Generally, it is contemplated that the pulling head (301) disclosed herein will be attached to the terminating end of a liner pipe in a manner known to those of ordinary skill in the art such as, but not limited to, the back end (302) of the pulling head (301) being butt fused to the terminating end of the liner pipe. The front end (303) of the pulling head (301) is comprised of a plurality of fingers (305). In one embodiment, the front end (303) of the pulling head (301) is comprised of 5 fingers (305). In another embodiment, the front end (303) of the pulling head (301) is comprised of 6 fingers (305). It should be understood that the number of fingers (305) located at the front end (303) of the pulling head (301) is dependent upon the size and orientation of the existing pipeline and the liner pipe being utilized and could be any number that is two or greater.

The plurality of fingers (305) of the pulling head are each generally comprised of a tip (307) and a base (308), the tip of each of the fingers (305) representing the terminus of the front end (303) of the pulling head (301) and the base (308) of the fingers (305) being the portion of the fingers (305) connected to the body of the pulling head (301). At the base (308) of each of the fingers (305) is a flexion point (306). As will be discussed in more detail later in this application, in response to an exerted pulling force, the fingers (305) will pivot on the flexion point (306) from an open orientation, as depicted in FIG. 2, to an engaged orientation, as depicted in FIG. 3.

Two or more bore holes (320) will be located in each of the fingers (305) between the apex (307) and the base (308). These bore holes (320) will be oriented in a biased manner, as depicted in FIGS. 2-3. The number of bore holes (320) is dependent on the pressure of the system. In a system where more force vectors will be exerted on the pulling head (301), more bore holes (320) will be utilized. No matter the number of bore holes (320) on the finger, they will be oriented in a biased orientation. This orientation functions to prevent ripping off and the type of mechanical damage to the pulling head that was common in the pulling heads of the prior art.

The body (330) of the pulling head (301) comprises the area of the pulling head (301) from the flexion point (306) to the back end of the pulling head (301). The body (330) of the pulling head is comprised of two or more bore holes (320) for each finger (305) of the pulling head (301). Similar to the bore holes (320) located on the fingers (305), the number of bore holes (320) located in the body (330) is determined by the pressure of the system. In addition, the two or more bore holes (320) are also placed in a biased orientation.

The pulling head (301) is connected to a winch via a plurality of steel plates (200) and corresponding cable straps with eyes (300) (or other strap methodology known to those of ordinary skill in the art for connecting a pulling head to a winch). The number of steel plates (200) utilized directly corresponds to the number of fingers (305) of the pulling head (301), one steel plate corresponding to each finger (305). In an embodiment, the diameter of each steel plate (200) will match the diameter of each finger (305), however this orientation is not determinative. Any dimension of steel plate (200) that can withstand the force vectors in the system and maintain a proper connection between the cables (300) and the pulling head (301) is contemplated in this disclosure.

As depicted in the side view shown in FIG. 4, the steel plate has a first half (250) and a second half (225), the first half (250) and the second half (225) being separated by a bend (205). In one embodiment, the bend (205) will be about 5° to 15°. In another embodiment the bend (205) will be 5°-10°. Further, in alternative embodiments it is contemplated that the bend (205) in each of the plurality of steel plates (200) will be supported with gussets or other methodology known to those of ordinary skill in the art for supporting an angle in a device. The bend (205) in each of the steel plates (200) correlates with the flexion point (306) of the fingers (305). Thus, when installed on the fingers (305) via the bore holes (320), the bend (205) in each of the installed steel plates (200) lines up with the flexion point (306) on the finger to which it is installed.

In addition, as demonstrated in FIG. 5, the steel plates (200) will be further comprised of a plurality of bore holes (320). These bore holes (320) will be located on the first half (250) and the second half (225) of the steel plates (200). The bore holes (320) in the steel plates (200) directly correspond and attach to the bore holes (320) in the fingers (305). Thus, the bore holes (320) on the steel plates (200) are biased in orientation, as demonstrated in FIGS. 4 and 5.

The plurality of steel plates (200) are installed on the fingers (305) via the plurality of bore holes (320) and an attachment means known to those of ordinary skill in the art. Generally, any attachment means that can withstand the extreme force vectors present in the system when it is under pressure are contemplated in this disclosure. Currently, bolts of sufficient strength are used, but that is by no means required. When the plurality of steel plates (200) are attached to the pulling head (301), the bore holes (320) on the second half (225) of the steel plates (200) will be attached to the bore holes (320) on the body (330) of the pulling head (301), the bore holes (320) of the first half (250) of the steel plates (200) will be attached to the bore holes (320) on the fingers (305), and the bend (205) in the steel plate will line up with the flexion point (306) of the pulling head (301). Thus, the fingers (305) will generally be pointed toward the center axis of the pulling head (301).

The plurality of steel plates (200) further comprise an attachment hole (400). As demonstrated in FIG. 5, in certain embodiments, the attachment hole (400) will be located at or near the terminating end of the first half (250) of the steel plate (200). Any size, shape or location attachment hole (400) that is able to withstand the force vectors in the engaged system is contemplated in this application.

In one embodiment, as depicted in FIG. 3, the pulling head (301) will be attached to the winch or other pulling mechanism known to those of ordinary skill in the art in the following manner. In a first step, the plurality of steel plates (200) will be attached to the pulling head (301). In this step, as noted previously, the plurality of steel plates (200) will be attached to the plurality of fingers (305) and the body (330) of the pulling head via the bore holes (320) on the pulling head (301) and the plurality of steel plates (200). In a second step, each of the plurality of cables (300) will be attached to the attachment holes (400) of the plurality of steel plates (200). One cable (300) will generally be attached to each steel plate (200) via an attachment hole (400). Generally, any form of attachment of the cables (300) to the steel plates that is able to withstand the force vectors in the system is contemplated in this application. In one embodiment, the cables (300) are attached to the attachment holes (400) of the steel plates (200) via clevis pins.

As noted previously, the pulling head system and device (301) described herein moves from an open orientation, as depicted in FIG. 2, or toward an engaged orientation, as depicted in FIG. 3, depending upon the forces applied to the system. When no force is applied to the system, the pulling head will be in the open position depicted in FIG. 2. When pulling force is applied to the system via the winch (or other pulling mechanism known to those of ordinary skill in the art) and the cables (300), the fingers (305) of the pulling head (301) will flex at their flexion points (306) creating a compressed head (600) at the tip (307) of the fingers. The compressed head (600) will generally be polygonal with a number of sides corresponding to the number of steel plates (200) and fingers (305) in the embodiment. For example, in an embodiment where the pulling head (301) has five fingers (305) and five corresponding steel plates (200), the compressed head (600) will have a generally pentagonal shape; in an embodiment where the pulling head (301) has six fingers (305) and six corresponding steel plates (200), the compressed head will have a generally hexagonal shape, and so on.

The compressed angle of the pulling head system (301) described herein is an improvement over the pulling heads of the prior art because, similar to the head of a needle, its compressed tip allows it to more easily navigate the bends and offsets in the existing pipeline system that could be troublesome to the systems of the prior art. Further, the offset bore holes in combination with the steel plates (200) and flexible fingers (305) offer greater resistance to the force vectors in the system, thereby averting the yanking off and mechanical failure common with the pulling heads used in the prior art during insertion processes.

While this invention has been disclosed in connection with certain preferred embodiments, this should not be taken as a limitation to all of the provided details. Modifications and variations of the described embodiments may be made without departing from the spirit and scope of this invention, and other embodiments should be understood to be encompassed in the present disclosure as would be understood by those of ordinary skill in the art.

The invention claimed is:

1. A pulling head for pulling a compressed pipe liner into a host pipe, the pulling head comprising:
   a body; and
   a plurality of fingers each attached to the body at an associated flexion point,
   wherein each of the plurality of fingers has a steel plate attached thereto across the associated flexion point;
   wherein each of the steel plates comprises a bend, an attachment hole and a plurality of bore holes, the bend corresponding to the flexion point of the associated finger; and
   wherein the plurality of fingers pivot at the associated flexion points from an open orientation to a closed orientation when the plurality of fingers are placed under tension from a winch.

2. The pulling head of claim 1, wherein the pulling head is attached to a terminating end of the compressed liner pipe.

3. The pulling head of claim 2, wherein the pulling head is butt fused to the terminating end of the compressed liner pipe.

4. The pulling head of claim 1, wherein the pulling head is comprised of five fingers.

5. The pulling head of claim 1, wherein the pulling head is comprised of six fingers.

6. The pulling head of claim 1, wherein two or more bore holes are located on each of the plurality of fingers, the two or more bore holes being oriented in a biased orientation.

7. The pulling head of claim 1, wherein two or more bore holes are located on the body of the pulling head for each of the plurality of fingers, the bore holes being oriented in a biased orientation.

8. The pulling head of claim 1, wherein the pulling head is connected to the winch via a plurality of cables.

9. The pulling head of claim 1, wherein the steel plates are attached to the fingers of the pulling head via the bore holes and an attachment means.

* * * * *